…

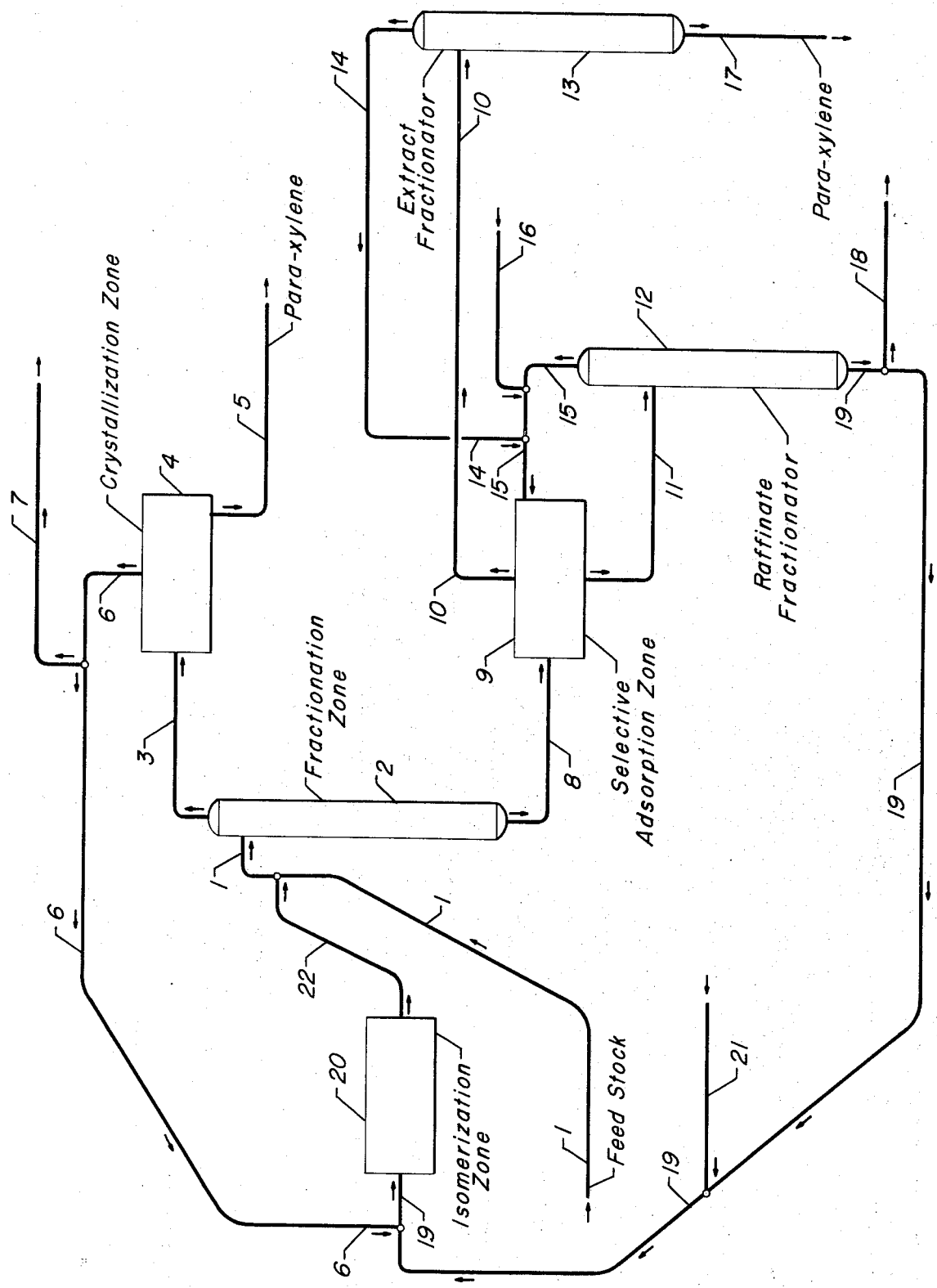

United States Patent Office 3,813,452
Patented May 28, 1974

3,813,452
PROCESS FOR SEPARATING PARA-XYLENE
Herbert J. Bieser, Des Plaines, Ill., assignor to Universal
Oil Products Company, Des Plaines, Ill.
Filed Oct. 20, 1972, Ser. No. 299,570
Int. Cl. C07c 7/02, 15/08
U.S. Cl. 260—674 SA                    7 Claims

ABSTRACT OF THE DISCLOSURE

High purity para-xylene is recovered and produced in high yields from feed streams containing $C_8$ aromatic and $C_8$ nonaromatic hydrocarbons. Removing the nonaromatic $C_8$ hydrocarbons along with some para-xylene in a fractionation zone allows the use in an adsorption zone of an easily available inexpensive desorbent boiling in about the range of some of the nonaromatic $C_8$ hydrocarbons. Loss of para-xylene from the process is minimized by directing the fractionation zone overhead to a crystallizer for recovery of the para-xylene. Para-xylene deficient streams can be directed to a xylene isomerization zone for the production of additional para-xylene.

BACKGROUND OF THE INVENTION

Field of the invention

The field of art to which the claimed invention pertains is hydrocarbon separation. In particular, the present invention pertains to a process by which high purity para-xylene is separated and produced in high yields from a $C_8$ aromatic mixture which also contains $C_8$ nonaromatics. The process permits the use of an efficient and inexpensive desorbent in a selective adsorption step.

DESCRIPTION OF THE PRIOR ART

Para-xylene, because of its utilization in the production of terephthalic acid and dimethylterephthalate, both of which are converted into polyester fiber and film, is the $C_8$ aromatic isomer currently in greatest demand. The other xylene isomers are also of some economic importance but are in less demand as chemical intermediates. Thus, while ortho-xylene, meta-xylene, and ethylbenzene are used in the production of phthalic anhydride, isophthalic acid, and styrene, respectively, these isomers are more typically isomerized to produce additional amounts of the more desired para-xylene.

A typical $C_8$ aromatic feedstock which contains all of the $C_8$ aromatic isomers in varying quantities is not readily separated by fractional distillation into all of the individual isomers. Ortho-xylene, which has a boiling point 3.5° C. higher than that of the nearest other $C_8$ aromatic (meta-xylene), can be separated by conventional fractional distillation techniques. Such ortho-xylene towers will contain 100 to 150 trays and will operate with about a 5–8 to 1 reflux to feed ratio. Ethylbenzene can be separated with increased difficulty from such a $C_8$ aromatic mixture but only by more intricate super-fractionation since its boiling point is within 2.2° C. of the boiling point of para-xylene. Typical ethylbenzene fractionators contain 300 to 400 actual trays and require about a 25–50 to 1 reflux to feed ratio. Since the meta- and para-xylenes differ by only 0.7° C. in boiling point, however, separation by distillation is essentially impossible and other means have to be used.

Although selective sulfonation and $HF$–$BF_3$ processing schemes have been employed for separating para- and meta-xylene, the most commonly encountered commercial technique for separating meta- and para-xylene is fractional crystallization, a separation method well known to the art. Unfortunately, complete recovery of high purity para-xylene from a given feed stream is impossible by fractional crystallization because of the eutectic formed between meta-xylene and para-xylene. In fact, 98+% purity para-xylene can be recovered from typically encountered refinery streams in only about 60% para-xylene recovery per pass through the crystallization zone.

It is to such a separation as this that selective adsorption techniques are well suited and indeed adsorption techniques utilizing crystalline aluminosilicates have been used successfuly to separate meta- and para-xylene. Fleck U.S. Pats. 3,133,126 and 3,114,782; Neuzil U.S. Pats. 3,558,730, 3,558,732, 3,626,020, 3,663,638, and deRosset U.S. Pat. 3,665,046; and Chen U.S. Pat. 3,668,266 are illustrative examples. Selective adsorption has the advantage of being able to produce high purity para-xylene in higher yields (about 85–95% or higher) than those obtainable by fractional crystallization.

In a particular selective adsorption process, described in U.S. Pats. 3,558,730; 3,558,732; 3,626,020; 3,663,638 and 3,665,046, a feed mixture containing $C_8$ aromatic isomers contacts a bed of crystalline aluminosilicate adsorbent to effect the selective adsorption of a first $C_8$ aromatic component, a raffinate stream comprising less selectively retained xylene-isomers is withdrawn from the adsorbent bed, the adsorbent bed is contacted with a desorbent material to remove the selectively adsorbed first $C_8$ aromatic component from the adsorbent, and the desorbed $C_8$ aromatic in admixture with desorbent is withdrawn from the adsorbent mass. The desorbent is then fractionated from the raffinate and extract streams for subsequent reuse in the process. The selectively adsorbed isomer is usually para-xylene.

As taught in U.S. Pat. 3,558,732, toluene is the preferred desorbent material. This selective adsorption process in which toluene is used as the desorbent to recover high purity para-xylene is suited only to an extracted $C_8$ aromatic feedstock which is essentially free of nonaromatic hydrocarbons. Such a feedstock would be the $C_8$ aromatic extract produced by a typical solvent extraction process from a pyrolysis gasoline or from a reformed naphtha. Feedstocks such as nonextracted $C_8$ reformate heartcuts or isomerization process effluents, both of which contain significant amounts of $C_8$ nonaromatics, create problems in the fractionation of toluene desorbent from the raffinate and extract streams.

Difficulty is encountered in separating $C_8$ nonaromatics from the toluene desorbent because of their close boiling points. $C_8$ nonaromatics therefore increase in concentration in the desorbent and contaminate the desorbent. Contaminated desorbent is subsequently carried into the extract fractionator and some will appear in the para-xylene product thereby reducing purity.

Although the difficulty can be avoided by using a desorbent having a boiling point higher than the $C_8$ aromatics, such as diethylbenzenes, costs are higher than for the light desorbent and the yield of high purity para-xylene is generally not as high. Likewise, feed fractionation schemes could also be devised to remove most of the $C_8$ nonaromatics with almost none of the para-xylene but studies have shown that such super-fractionators are not economical. Consequently, the art strives for more economical and efficient methods for the recovery of para-xylene from a $C_8$ aromatic mixture containing $C_8$ nonaromatics.

The applicant is aware of the abundance of prior art processes directed toward the separation of the para-xylene using either selective adsorption or fractional crystallization. As well, the combination of selective adsorption and crystallization has been used in various schemes to separate and recover other $C_8$ aromatics simultaneously with para-xylene. However, it has not been recognized in the art that removing $C_8$ nonaromatics along with some para-xylene from a $C_8$ aromatic feedstick which contains $C_8$ nonaromatics would permit parallel operation of a crystallization zone and a selective adsorption zone in a manner which avoids the limitations of each to produce high yields of high-purity para-xylene.

By removing most of the $C_8$ nonaromatics along with some para-xylene, the combination process of this invention allows the selective adsorption zone to be operated with a particular desorbent which is most suitable for the separation being effected. Accumulation of nonaromatics in the circulating desorbent and possible contamination of the para-xylene product stream are thereby avoided.

Since some para-xylene is permitted in the $C_8$ nonaromatic stream, superfractionation to sharply separate $C_8$ nonaromatics from $C_8$ aromatics is not required and fractionation costs are thereby reduced. Para-xylene in the $C_8$ nonaromatic stream is recovered by a crystallization zone while the bulk of the para-xylene, contained in the stream essentially devoid of $C_8$ nonaromatics, is recovered by the selective adsorption zone to take advantage of its higher recovery capabilities. The $C_8$ nonaromatics can be recycled as part of the crystallizer mother liquor to an isomerization zone where their presence is beneficial to promote desired isomerization reactions. The raffinate from the adsorption zone can as well be recycled to the isomerization zone for the production of more para-xylene. Because the selective absorption step produces a higher yield of para-xylene, the para-xylene-deficient raffinate returned to the isomerization zone from the adsorption zone is farther from equilibrium and, by virtue of the larger equilibrium driving force, possesses a higher isomerization zone yield potential than crystallization filtrate from the same feedstock.

SUMMARY OF THE INVENTION

Accordingly, it is an object of the present invention to provide a process whereby para-xylene can be recovered from a feedstock containing $C_8$ aromatics as well as $C_8$ nonaromatics by a selective adsorption step which employs a desorbent having a boiling point lower than that of the $C_8$ aromatics. Such a process avoids the accumulation of $C_8$ nonaromatics in the circulating desorbent and contamination of the para-xylene product stream. This object is accomplished in one embodiment by: separating the feedstock to produce a para-xylene-containing first liquid phase and a second liquid phase substantially free of $C_8$ nonaromatics comprising para-xylene and at least one other $C_8$ aromatic isomer; contacting the second liquid phase with an adsorbent at adsorption conditions to effect the selective adsorption of a $C_8$ aromatic feed component; contacting the adsorbent with a desorbent material having a boiling point lower than the $C_8$ aromatics to effect displacing of the selectively adsorbed feed component; withdrawing from the adsorbent an extract stream comprising desorbent material and the selectively adsorbed feed component; and, recovering the selectively adsorbed feed component from the extract stream.

In another embodiment, para-xylene contained in the first liquid phase is recovered by a crystallizer. In this same embodiment, at least part of the mother liquor from the crystallizer and at least part of a raffinate stream from a selective adsorption zone are directed to an isomerization zone to produce more of the desired para-xylene isomer.

DETAILED DESCRIPTION OF THE DRAWING

The process of the present invention can be most clearly described by reference to the attached drawing schematically illustrating the production and recovery of high purity para-xylene from a feedstock containing both $C_8$ aromatics and $C_8$ nonaromatics. Of necessity, the flow scheme shown in the drawing is simplified and does not contain valves, pumps, heat exchangers, compressors, or other detailed equipment. Only those vessels and lines necessary for a complete and clear understanding of the present invention are illustrated, with any obvious modifications made by those possessing expertise in the art of $C_8$ aromatics production and recovery being included within the broad scope of the present invention.

Referring now to the schematic diagram, a feedstock containing $C_8$ aromatics and $C_8$ nonaromatics, such as a $C_8$ reformate heart cut, enters the process of the present invention via line 1 and is admixed with a hereinafter described isomerization zone effluent entering via line 22. The mixture consisting essentially of $C_8$ aromatics and $C_8$ nonaromatics, is passed via line 1 to fractionation zone 2. The purpose of fractionation zone 2 is to remove the $C_8$ nonaromatics materials and obtain a $C_8$ aromatic mixture essentially free of $C_8$ nonaromatics. Since costly superfractionation is to be avoided, the overhead will contain some para-xylene which will be recovered by a crystallization zone. An adequate separation can be achieved with a fractionator incorporating about 40 to 50 theoretical trays and working with about a 1.5 reflux to feed ratio. Although not shown, the mixture could be first passed to an ortho-xylene fractionation zone for removal of ortho-xylene as a bottoms product before being sent to fractionation zone 2.

Overhead from fractionation zone 2 containing $C_8$ nonaromatics and some para-xylene is passed via line 3 to crystallization zone 4 for recovery of the para-xylene. High purity para-xylene product leaves crystallization zone 4 via line 5 while mother liquor leaves via line 6 and is recycled to a hereinafter described isomerization zone. Part of the mother liquor may be withdrawn from the process via line 7 if desired.

The bottoms stream from fractionation zone 2 substantially free of $C_8$ nonaromatics comprising para-xylene and at least one other $C_8$ aromatic isomer is directed via line 8 to selective adsorption zone 9. An extract stream comprising para-xylene and desorbent exits via line 10 to extract fractionator 13 and a raffinate stream comprising desorbent and less selectively adsorbed components exits via line 11 to raffinate fractionator 12.

The desorbent which has a lower boiling point than the $C_8$ aromatics is removed as overhead product from both extract fractionator 13 and raffinate fractionator 12 and recycled to the adsorption zone 9 for reuse.

Desorbent removed via line 14 from extract fractionator 13 is mixed with desorbent removed via line 15 from raffinate fractionator and the mixture enters the adsorption zone 9 via line 15. High purity para-xylene leaves extract fractionator 13 and the process via line 17. If desired this stream could be mixed with the para-xylene product leaving crystallization zone 4 via line 5. Makeup or initial fill desorbent from outside sources can enter the process and the adsorption zone via line 16. Raffinate components, the less selectively adsorbed feed components, are removed from raffinate fractionator 12 and recycled to an isomerization zone 20 via line 19. If desired, a portion of the raffinate can be removed from the process via line 18.

Raffinate components removed from raffinate fractionator 12 via line 19 and mother liquor removed from crystallizer 4 via line 6 are mixed and the mixture enters the isomerization zone 20 via line 19. As well, an external $C_8$ aromatic stock, deficient in para-xylene, may first enter the general process of the present invention via line 21 and pass to isomerization zone 20 via line 19 instead of entering the process via line 1 as previously described.

Isomerization zone 20 is maintained under isomerization conditions to effect the production of additional amounts of para-xylene. The effluent from isomerization zone 20, comprising mixed $C_8$ aromatics approaching thermodynamic equilibrium composition, is then removed via line 22 and admixed with the fresh feed stream entering via line 1. The mixture is passed to fractionation zone 2 through line 1 as previously mentioned. Any $C_7^-$ and/or $C_9^+$ hydrocarbons formed as a result of side reactions in isomerization zone 20 may be removed, by fractional distillation means not shown, from line 22 to prevent any accumulation of the species in the process of this invention.

DETAILED DESCRIPTION OF THE INVENTION $C_8$ aromatic-containing feedstocks from which xylenes are recovered are, generally speaking, either extracted or non-extracted. Extracted feeds are those $C_8$ aromatic extracts which have been produced by a typical solvent extraction process from a pyrolysis gasoline or from a naphtha which has been reformed with a platinum-halogen containing catalyst. Such extracted feedstocks are essentially free of non-aromatic hydrocarbons. Non-extracted feedstocks include $C_8$ aromatic cuts of hydrogenated pyrolysis naphthas or reformates prepared by fractionation without solvent extraction and which therefore contain varying amounts of nonaromatic hydrocarbons. It should be noted that such feedstocks whether extracted or nonextracted will be essentially olefin free. Furthermore, it is contemplated that any feedstock to our process will be essentially olefin free. Shown in Table No. 1 is an analysis of a typical nonextracted reformate $C_8$ heartcut in which $C_8$ nonaromatics amount to 2.3 wt. percent. Likewise the effluent from a catalytic xylene isomerization process also contains varying amounts of these $C_8$ nonaromatics. Table No. 2 shows the amounts of individual $C_8$ nonaromatics contained in a typical xylene isomerization reactor effluent and their respective normal boiling points. Here the total $C_8$ nonaromatics amount to 8.52%.

TABLE NO. 1.—TYPICAL NON-EXTRACTED REFORMATE $C_8$ HEARTCUT ANALYSIS

M.S. Hydrocarbon breakdown, wt. percent

Aromatics:
$C_8$ ---------------------------------- 73.2
$C_9$ ---------------------------------- 0.3

73.5

Paraffins:
$C_6$ ---------------------------------- 0.1
$C_7$ ---------------------------------- 0.2
$C_8$ ---------------------------------- 2.1
$C_9$ ---------------------------------- 20.7
$C_{10}$ ---------------------------------- 0.8

23.9

Monocyclo paraffins:
$C_6$ ---------------------------------- 1.0
$C_7$ ---------------------------------- 1.2
$C_8$ ---------------------------------- 0.2
$C_9$ ---------------------------------- 0.2

2.6

TABLE NO. 2

[Individual $C_8$ nonaromatic components in a typical xylene isomerization reactor effluent and their normal boiling points]

| | Weight percent in reactor effluent | Normal boiling point, °F. |
|---|---|---|
| $C_8$ paraffins: | | |
| 2,4-dimethylhexane | 0.33 | 229.0 |
| 2,3-dimethylhexane | 0.33 | 240.1 |
| 2-methylheptane | 0.63 | 243.8 |
| 4-methylheptane | 0.90 | 243.9 |
| n-Octane | 0.33 | 258.2 |
| Total | 2.52 | |
| $C_8$ naphthenes: | | |
| 1,1,3-trimethylcyclopentane | 0.42 | 220.8 |
| 1,trans-2,cis-4-trimethylcyclopentane | .48 | 228.7 |
| 1,trans-2,cis-3-trimethylcyclopentane | .12 | 230.4 |
| 1,1,2-trimethylcyclopentane | .18 | 236.7 |
| 1,cis-2,trans-4-trimethylcyclopentane | .12 | 242.1 |
| 1,cis-2,trans-3-trimethylcyclopentane | .12 | 243.5 |
| 1,1-dimethylcyclohexane | .36 | 247.2 |
| 1,trans-4-dimethylcyclohexane | .90 | 246.8 |
| 1,cis-3-dimethylcyclohexane | | 248.2 |
| 1-methyl,cis-3-ethylcyclopentane | .42 | 250.0 |
| 1-methyl,trans-3-ethylcyclopentane | 1.02 | 250.0 |
| 1-methyl,trans-2-ethylcyclopentane | | 250.2 |
| 1-methyl,4-ethylcyclopentane | | |
| 1,cis-2,cis-3-trimethylcyclopentane | .30 | 253.4 |
| 1,trans-2-dimethylcyclohexane | | 254.2 |
| 1,trans-3-dimethylcyclohexane | .42 | 256.0 |
| 1,cis-4-dimethylcyclohexane | | 255.8 |
| Isopropylcyclopentane | .24 | 259.6 |
| 1-methyl,cis-2-ethylcyclopentane | .12 | 262.5 |
| 1,cis-2-dimethylcyclohexane | .12 | 265.5 |
| Ethylcyclohexane | .66 | 269.2 |
| Total | 6.00 | |
| Aromatics: | | |
| Toluene | | 231.1 |
| Ethylbenzene | | 277.1 |
| p-Xylene | | 281.0 |
| m-Xylene | | 282.4 |
| o-Xylene | | 291.9 |

It is these $C_8$ nonaromatics which cause problems in solid bed adsorption processes in which the desorbent boils below the $C_8$ aromatics and in which the desorbent is separated from raffinate and extract materials as overhead in fractionation towers. Such a process is especially exemplified by U.S. Pat. 3,558,732 in which the preferred desorbent is toluene.

In the absence of $C_8$ nonaromatics, the separation of the desorbent toluene from the selectively adsorbed feed component (usually para-xylene) and from the less selectively adsorbed feed components (the other $C_8$ aromatics) is easily accomplished because of the 40° to 50° F. difference in their boiling points as shown in Table No. 2. In commercial practice the raffinate fractionator is generally operated such that a small amount of desorbent is left in the bottoms product to prevent accumulation of contaminant $C_8$ material in the circulating desorbent. As to the extract fractionator operation, however, desorbent in the bottoms product would reduce the purity of the para-xylene product. Therefore, a sharp separation leaving little or no desorbent in the bottoms product is desired. These separations in the raffinate and extract fractionators are rather easily achieved in the absence of $C_8$ nonaromatics.

The presence of $C_8$ nonaromatics in the feedstock makes the separations more difficult which can result in accumulation of $C_8$ nonaromatics in the circulating desorbent and contamination of the para-xylene product. The mechanism by which such accumulation and contamination might occur is as follows. In the presence of high concentrations of aromatics, the $C_8$ nonaromatics are more volatile than indicated by their normal boiling points. As an approximation the paraffins will behave as if their boiling points were about 20° lower than the true values; the naphthenes will behave as if their boiling points were about 12° lower. Thus, these $C_8$ nonaromatics now have apparent boiling points closer to the desorbent. None of these $C_8$ nonaromatics are significantly adsorbed by the adsorbent in the presence of aromatics and after the feedstock contacts the adsorbent they will therefore appear in the feed to the raffinate fractionator along with the desorbent and the less selectively retained $C_8$ aromatics. Now any $C_8$ nonaromatics which are put into the raffinate fractionator overhead stream because of apparent boiling points close to that of the desorbent will accumulate in the desorbent and will be carried as part of the desorbent back to the adsorbent chamber. Part of them will appear in the feed to the extract fractionator and some of these, because of increased fractionation difficulty will then appear as a contaminant in the para-xylene product.

Thus the process of the present invention is specifically directed to feedstocks containing $C_8$ nonaromatics and is offered as a practical, economical and heretofore unrecognized solution to the problems that results from the use of such feedstocks. Specifically, the process of our invention enables one to employ the selective adsorption process such as that described in U.S. Pat. 3,558,732 to a feedstock which contains $C_8$ nonaromatics in addition to $C_8$ aromatics. Other solutions have of course been proposed, one of which is to use a desorbent that has a boiling point sufficiently higher than the $C_8$ aromatics (such as diethylbenzene) to permit easy separation from the $C_8$ aromatics. Raffinate and extract would then be taken overhead from their respective fractionators and desorbent would be taken out the fractionator bottoms. Desorbent costs and utility costs are, however, higher than when a light desorbent is employed and the heavier desorbent itself is not as efficient as is the light desorbent. Other solutions offered include various fractionation schemes to sharply split between the $C_8$ nonaromatics, and one or more desired $C_8$ aromatic isomers. Studies have shown, however, that such solutions are not economical.

In the process of my invention, no novelty is asserted to as to any of the individual steps employed therein; rather, novelty resides in the unique manner in which these steps are combined as will be described below.

According to the process of the present invention, a $C_8$ aromatic-containing feedstock of the type previously described is separated by a fractionation zone to produce a bottoms fraction essentially free of $C_8$ nonaromatic material comprising para-xylene and at least one other $C_8$ aromatic isomer and an overhead stream comprising essentially all the $C_8$ nonaromatics and para-xylene. Since a high severity of fractionation is not necessary, a super fractionator is not required. An adequate separation can be achieved with the fractionator incorporating about 40 to 50 theoretical trays and operating with about a reflux to feed ratio of about 1.5.

The term "adequate separation" shall mean a separation in which essentially all of the $C_8$ nonaromatics and about 5% of the para-xylene in the feed stream are removed as overhead in the fractionation zone. The cost and operating expense of this fractionator are therefore very reasonable which is consistent with the general industry desire to simplify fractionation and lower fractionation costs wherever possible in xylene processing schemes.

The overhead stream comprising $C_8$ nonaromatics and para-xylene is then separated by a fractional crystallization to produce a relatively pure (at least about 99%) para-xylene stream and a mother liquor stream containing the $C_8$ nonaromatics and residual para- and meta-xylene of approximately eutectic composition.

In a typical commercial crystallization process, a $C_8$ aromatic stream, which preferably contains about 15 to 20% para-xylene, is first cooled to about −40° C. and is then further cooled by further heat exchange with a scraped internal surface which is kept at about −70° C. by external cooling, preferably with boiling ethylene. A slurry of para-xylene crystals is thus formed and passed into a holding tank from which the slurry is centrifuged, either batchwise or continuously, by a basket type centrifuge with a scraping knife automatically rising to cut the retained crystals from the centrifuge basket and drawing these recovered crystals to a melting tank. The depleted mother liquor is then drawn off and may be used as a cooling medium in the crystallization process.

The crystals recovered from the centrifuge typically contain about 80 to 85% para-xylene and are further processed by melting and recrystallization to at least 95% purity and preferably of at least 99% purity. The design and operation of these recrystallization units are similar to that utilized in the first crystallization unit with the chief differences being that the second crystallization unit (recrystallization unit) employs a scraped chiller held at about −18° C. utilizing propane as a refrigerant, and that the depleted mother liquor, recovered from the recrystallization unit and containing typically about 45% para-xylene, is recycled to the first stage of the crystallization unit.

Complete recovery of all the para-xylene contained in the feed to such a conventional commercial fractional crystallization unit is impossible because the solid eutectic mixture formed between the para-xylene and meta-xylene varies from about 14% para-xylene to about 9% para-xylene depending on the diluents which may be present. While various extraneous diluents have been proposed for utilization in conventional crystallization units by changing either the eutectic composition or delaying its formation, such diluents have not found extensive use. As well, other hydrocarbons which remain in the mixture serve also as diluents, thus reducing the para-xylene content of the eutectic. In conventional crystallization units only about 50 to 60% of the para-xylene in the feed is recovered economically.

By utilizing the process of the present invention, this para-xylene crystallization unit can be greatly reduced in size because the bulk of the para-xylene in the process feed is removed by the selective adsorption zone which has the capability of producing high purity para-xylene in higher yields than does the crystallizer. For this reason, the present invention is especially suited to revamps and expansions of other xylene separation processes in which a crystallizer is used as part of that xylene separation operation.

At least a portion of the mother liquor stream recovered from the crystallization step is recycled to a hereinafter described isomerization zone maintained at isomerization conditions to produce a $C_8$ aromatic mixture containing approximately equilibrium amounts of the $C_8$ aromatic isomers. As previously mentioned various amounts of nonaromatics will also be produced by the isomerization zone.

The bottoms stream produced by the fractionation zone, substantially free of $C_8$ nonaromatics and comprising para-xylene and at least one other $C_8$ aromatic, is sent to a selective adsorption zone. In the absence of nonaromatics a light desorbent, one having a boiling point lower than the $C_8$ aromatics, can be employed in this zone without fractionation difficulties. This bottoms stream is separated by selective adsorption to produce a high yield (at least about 95%) of high purity (at least about 99%) para-xylene and a stream comprising the less selectively adsorbed feedstock components. The high purity para-xylene stream can, of course, be combined with that para-xylene stream produced by the crystallizer. This selective adsorption separation, hereinafter described in more detail, is accomplished by utilizing crystalline aluminosilicates.

The relatively para-xylene free raffinate stream is recycled, along with the crystallizer mother liquor to the aforementioned, isomerization zone for the production of additional amounts of desired para-xylene. This isomerization reaction is effected by means well known to those trained in the art by employing isomerization catalysts and conditions capable of isomerizing not only the xylenes but also capable of isomerizing ethylbenzene to xylenes. Since the ethylbenzene isomerization requires the ethylbenzene to go through a naphthene intermediate before the formation of a xylene, it is necessary to utilize an isomerization catalyst having a dual, acid-acting and hydrogenation-dehydrogenation function. This hydrogenation-dehydrogenation function is typically provided by a active metallic component such as a metal from Groups VI–B, VIII–B and I–B of the Periodic Table of Elements, preferably the platinum group metals and particularly platinum. This metallic component is then combined in catalytically effective amounts, such as 0.1 to about 5 wt. percent, with an acidic refractory inorganic oxide support such as halogenated alumina, silica-alumina, the hydrogen forms of faujasite or mordenite and combinations of alumina and mordenite or faujasite. A particularly preferred catalytic composite comprises about 0.1 to about 2 wt. percent platinum and 0.1 to about 5 wt. percent fluorine and/or chlorine combined with a gamma-alumina carrier material. Suitable catalysts and operating conditions for this step are described, for example, in U.S. Pats. 3,078,318 and 3,538,173.

The isomerization reaction itself is effected in an isomerization zone wherein the catalyst is utilized either as a fixed bed or moving bed with the reactants contacting the catalyst in an upflow, downflow or radial flow pattern. Preferred is a fixed bed, vapor phase, downflow system. Suitable isomerization conditions under which the isomerization zone can be maintained include a temperature of about 200° C. to about 650° C. particularly about 350° C. to about 550° C., pressures of about atmospheric to about 100 atmospheres and liquid hourly space velocities of about 0.1 to about 10 hr.$^{-1}$. Mild hydrogenating conditions including the presence of hydrogen at a hydrogen to hydrocarbon mole ratio of 0.5:1 to about 20:1 are preferred. Further in some instances, halogen addition to the isomerization zone feedstock may be effected to control or maintain catalyst activity. Depending on activity desired, halogen concentrations from about 1 to about 1000 p.p.m. weight can be utilized. Any $C_7^-$ and/or $C_9^+$ hydrocarbons produced by side reactions are readily removed by conventional fractionation techniques.

The resultant isomerization effluent comprising a mixture of $C_8$ aromatics and $C_8$ nonaromatics is then directed along with the fresh $C_8$ aromatic feed stock to the previously described first fractionation zone.

In the selective adsorption step hereinbefore mentioned, an important factor used to determine the ability of a particular adsorbent to separate para-xylene from the other $C_8$ aromatic isomers is the selectivity of the adsorbent for one isomer compared to the other isomers. The selectivity (B) as used herein is defined as the ratio of the two isomers in an adsorbed phase over the ratio of the same two isomers in an unadsorbed phase at equilibrium conditions and is expressed in equation 1 below:

$$\text{Selective} = B_{x/y} = \frac{(x/y)\ a}{(x/y)\ u} \quad (1)$$

where $x$ and $y$ feed represent para-xylene and another isomer respectively, in volume percent, and the subscripts, $a$ and $u$ represent the adsorbed and unadsorbed phases respectively. The equilibrium conditions as defined here were determined when a feed containing these two isomers was passed over a bed of adsorbent and did not change composition after contacting the bed of adsorbent. In other words, there was no net transfer of material occurring between the unadsorbed and adsorbed phases when the selectivity of the two isomers was measured.

As can be seen, where the selectivity of the two isomers approaches unity, there is no preferential isomer adsorption by the adsorbent. As the value of (B) becomes greater than unity, there is a preferential selectivity by the adsorbent of one isomer. When comparing the selectivity of para-xylene over meta-xylene, a (B) larger than unity indicates preferential adsorption of para-xylene within the adsorbent while a (B) less than unity would indicate the inverse.

It is well known to the art that crystalline aluminosilicate zeolite adsorbents can be used in adsorptive-separation processes to separate various isomers. Common zeolites which can effectively separate the various aromatic isomers are the Type X, Type Y and mordenite zeolites containing selected cations at the exchangeable cationic sites within the zeolite crystal structure. Both the natural and synthetic aluminosilicates may be used as adsorbents.

In the hydrated form, the crystalline aluminosilicates may be represented by the formula represented in Equation 2, $$M_{2/n}O : Al_2O_3 : wSiO_2 : yH_2O \quad (2)$$

where M is a cation which balances the electrovalence of the tetrahedra, $n$ represents the valence of the cation, $w$ represents the moles of $SiO_2$, and $y$ the moles of water. The cations may be any one of a number of cations such as, for example, certain selected cations from the alkali metal cations or the alkaline earth cations.

Crystalline aluminosilicates which find use as adsorbents in the selective adsorption step of this invention, possess relatively well-defined pore structures. The exact type of aluminosilicate is generally referred to by the particular silica-alumina ratio and the pore dimensions of the cage structures. The faujasites are commonly represented as Type X and Type Y structured aluminosilicates and are defined by their varying silica to alumina ratios.

The Type X structured zeolite can be represented in terms of the mole ratio of oxides as represented in the following Equation 3, $$(0.9 \pm 0.2)M_{2/n}O : Al_2O_3 : (2.5 \pm 0.5)SiO_2 : yH_2O \quad (3)$$

where M represents at least 1 cation having the valence of not more than 3, $n$ represents the valence of M, and $y$ is a value up to about 8, depending upon the identity of M and the degree of hydration of the crystal. Zeolite Type X is described in U.S. Pat. No. 2,882,244.

The Type Y structured zeolite may be represented in the terms of the mole ratio of oxides for the sodium form as represented in the following Equation 4, $$(0.9 \pm 0.2)Na_2O : Al_2O_3 : wSiO_2 : yH_2O \quad (4)$$

where 2 is a value of from about 3 to about 9, and $y$ is a value less than about 8.

The exchangeable cationic sites for the Type X and Type Y zeolites, in general, can be defined as represented in Equation 2 above as M.

Cationic exchange or base exchange methods are generally known to those familiar with the field of crystalline aluminosilicate production and are generally performed by contacting a zeolite with an aqueous solution of soluble salts of the cations or cation desired to be exchanged on the sieve. The desired degree of cation exchange is allowed to take place before the sieves are removed from the aqueous solution and dried to a desired water content. It is contemplated that in cationic exchange, or base exchange methods, that the cation exchange may take place either by using individual solutions of the desired cations to be placed on the molecular sieve or by using exchange solutions containing mixtures of the cations which are desired to be exchanged onto the crystalline aluminosilicate zeolite.

In this specification, the terms Type X and Type Y structured zeolites shall refer to the basic crystalline aluminosilicates described in Equations 3 and 4 above which contains one or a combination of cations.

The cations or metals which can be placed on the Type X or Type Y structured zeolites include potassium, rubidium, cesium, beryllium, magnesium, barium, copper, silver, cerium, praseodymium, neodymium, samarium and combinations thereof.

The adsorption zone which employs the previously described adsorbents selectively adsorbs a particular isomer from the $C_8$ aromatic-containing feedstock passed into that zone. Specifically, where a feedstock comprising $C_8$ aromatics is fed into the adsorption zone containing a selected adsorbent, para-xylene is selectively retained by the adsorbent while the other isomers in the feed occupy the external volume surrounding the adsorbent and are not adsorbed with the degree of tenacity that the selectivity retained isomer, para-xylene, is adsorbed. Typically, the basic operating conditions can include passage of the feedstock in liquid or vapor phase through a bed of an adsorbent material. For ease of separation and for optimum contact area, the adsorbent is a small particle material and is generally 20 to 40 mesh in size. The feedstock is contacted with the adsorbent at conditions which allow a portion of the feedstock and typically substantially all of a particular isomer present in the feedstock to be retained by the adsorbent. The less selectively retained isomers of the feed, typically referred to as the raffinate material in the art, are removed from the adsorbent bed by contact with a third stream consisting either of another hydrocarbon or a gaseous material. In some instances, the third stream is a material which can desorb the selectively retained components of the feed but which is so diluted with another substance that there is no desorption of the selectively retained material. A purification or enrichment therefore occurs. Thus, para-xylene is selectively retained and other $C_8$ aromatic isomers are recovered as the raffinate. Thereafter, the adsorbent is contacted with a desorbent material at desorption conditions to effect the removal of the retained para-xylene from the adsorbent.

The adsorption and desorption operating conditions can be effected in either liquid or vapor phase. In either case the present invention permits the use of a desorbent having a boiling point lower than the $C_8$ aromatics since feed to the extract and raffinate fractionators can, of course, be liquid or vapor. Substantially the same or different pressures and temperatures can be used for adsorption and desorption. Adsorption and desorption conditions can include temperatures in the range of from about ambient to about 250° C. and pressures generally have atmospheric and in most instances within the range from about atmospheric to about 500 p.s.i.g. In some instances, both vapor and liquid combination operations can be effected, that is, adsorption can be effected in a liquid phase and desorption in the vapor phase, or adsorption in the vapor phase and desorption effected in the liquid phase with various temperature and/or pressure changes associated with the requirements to perform the operations in different phases.

Although other desorbents which have a boiling point higher than the $C_8$ aromatics can be used in the operation of the adsorption zone, the process of our invention is only concerned with those desorbents which have a boiling point lower than that of the $C_8$ aromatics. Of these the preferred desorbent, as taught in U.S. Pat. No. 3,338,732, is toluene. Toluene is readily available and is therefore not as costly as desorbents such as diethylbenzenes which have a boiling point higher than the $C_8$ aromatics. Additionally, utility costs are less with toluene.

The overall operations effected in the adsorption zone can be performed by typical swing-bed type operations or by employing the simulated moving-bed countercurrent flow operaitons. It is well known to those skilled in the separation art that manifold systems can be incorporated, where swing-bed operations are to be used, to allow continuous production of extract and raffinate streams by manipulating the input and output streams to the individual adsorption beds to effect continuous adsorption and desorption steps. The simulated moving-bed, countercurrent flow operations are typically performed through the use of a series of inlet and outlet lines connected to an elongated bed of adsorbent which lines are advanced in the direction of the general fluid flow through the fixed-bed by using a particular type of a rotating valve which allows the various operations to take effect simultaneously at different areas of the fixed-bed. When observing the operations from a certain location within the adsorption bed, adsorption and desorption cycles are seen in a repetitive manner and in a way which allows the efficient production of the desired extract and raffinate streams. The overall countercurrent fixed-bed simulated moving-bed type operations are generally demonstrated in U.S. Pat. No. 2,985,589. Preferably, operations of the selective adsorption zone portion of this invention are similar ot the oeprations disclosed in that reference patent.

I claim as my invention:
1. A process for the production and recovery of high purity para-xylene from a feedstock containing $C_8$ aromatics and $C_8$ nonaromatic hydrocarbons which comprises the steps of:
   (a) separating, in a first fractionation zone, said feedstock to produce a para-xylene-containing first overhead stream and a first bottom stream substantially free of $C_8$ nonaromatic hydrocarbons comprising para-xylene and at least one other $C_8$ aromatic isomer;
   (b) separating, in a crystallizer, said first overhead stream to produce a first high purity para-xylene stream and a $C_8$ nonaromatics first recycle stream;
   (c) separating, by a selective adsorption, said bottoms stream to produce a second high purity para-xylene stream and a para-xylene-deficient stream containing at least one other xylene isomer;
   (d) contacting, in an isomerization zone, said first recycle stream and at least a portion of said para-xylene deficient stream with an isomerization catalyst maintained at isomerization conditions to produce a mixture comprising $C_8$ hydrocarbons;
   (e) directing said mixture, commingled with said fresh feedstock, to said first fractionation zone.

2. The process of claim 1 further characterized in that the feed to the first fractionation zone has at least a portion of the ortho-xylene removed.

3. The process of claim 1 further characterized in that the adsorption step (c) comprises the steps of:
   (i) contacting said first overhead fraction with a mass of crystalline aluminosilicate contained in an adsorption zone maintained at adsorption conditions to effect the selective retention of an extract material;
   (ii) withdrawing from said adsorption zone a raffinate stream containing less selectively retained $C_8$ aromatics;
   (iii) contacting said adsorbent mass at desorption conditions with toluene to effect a removal of the extract material from the adsorbent; and,
   (iv) withdrawing from the adsorbent mass an extract stream comprising said extract material and desorbent.

4. The process of claim 1 further characterized in that the adsorption and desorption are effected in the liquid phase.

5. The process of claim 1 further characterized in that said extract material is para-xylene.

6. The process of claim 1 further characterized in that said aluminosilicate is a Type X or Type Y structured zeolite.

7. The process of claim 6 further characterized in that said zeolites contain cationic sites occupied by a metal selected from the group consisting of potassium, rubidium, cesium, beryllium, magnesium, barium, copper, silver, cerium, praseodymium, neodymium, samarium, and combinations thereof.

References Cited
UNITED STATES PATENTS

| | | | |
|---|---|---|---|
| 3,700,744 | 10/1972 | Berger et al. | 260—674 |
| 2,532,276 | 12/1950 | Birch et al. | 260—674 |
| 3,663,638 | 5/1972 | Neuzil | 260—674 |
| 3,133,126 | 5/1964 | Fleck et al. | 260—674 |
| 3,126,425 | 3/1964 | Eberly et al. | 260—674 |

DELBERT E. GANTZ, Primary Examiner

C. E. SPRESSER, JR., Assistant Examiner

U.S. Cl. X.R.

260—668 A, 674 A